Patented July 12, 1932

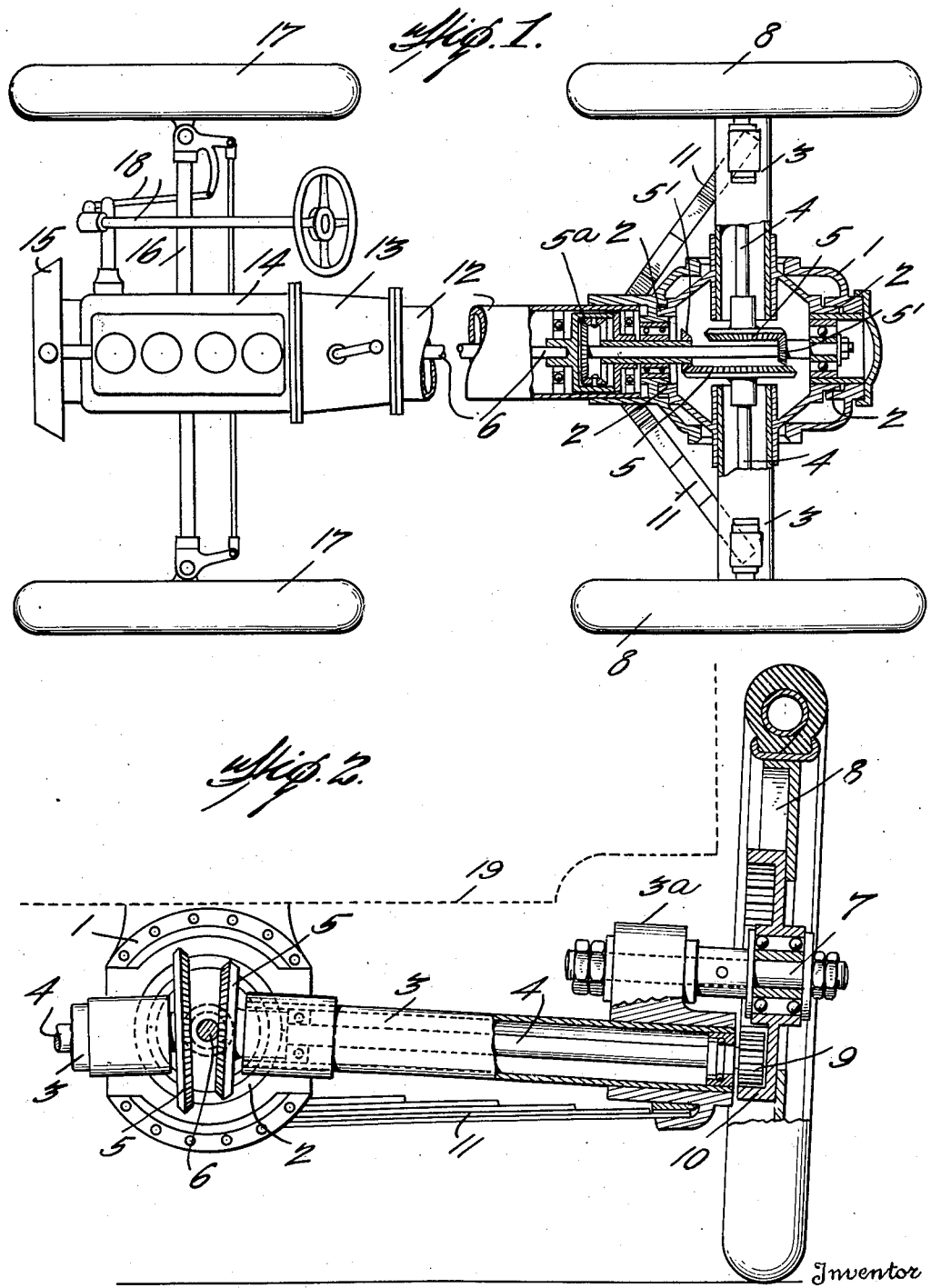

1,866,656

UNITED STATES PATENT OFFICE

HANS LEDWINKA, OF KOPRIVNICE, CZECHOSLOVAKIA

MOTOR VEHICLE DRIVING DEVICE

Application filed February 10, 1930, Serial No. 427,342, and in Germany January 21, 1929.

This invention relates to a driving device for motor vehicles with driving wheels supported upon oscillating half-axles, of the kind in which the centre of oscillation of the half-axles is located lower than the axes of the driving wheels.

With motor vehicles of the kind in which the wheels are supported upon oscillating half-axles, and with which the centres of oscillation of these half-axles are located at the same level as the axes of the driving wheels, the wheels, owing to the swinging motion, traverse a comparatively large path upon the ground transversely to the direction of travel. If the centres of swing of the half-axles are arranged lower the transverse motion of the wheels upon the ground becomes considerably smaller.

With non-driven axles the lower location of the centre point of swing of the half-axles does not involve any difficulties. With driving wheels supported upon swinging half-axles however the lower location of the centre point of swing introduces considerable difficulties. Driving devices for driving wheels supported upon swinging half-axles have already been proposed which facilitate the lower location of the centre of swing of the half-axles below the axis of rotation of the wheels. For example, it has been proposed to provide the central driving shaft with a worm in which the transverse shafts engage from above with corresponding worm wheels, the arrangement enabling the half-axles carrying the driving wheels to swing about the axis of the worm; this arrangement however has the disadvantage that it does not permit the use of a differential between the two half-axles.

According to the invention the lower location of the centre of swing of the half-axles carrying the driving wheels is facilitated hereby, that also the transverse shafts are supported lower than the axes of the driving wheels driven by them, so that the transmission of the movement from the transverse shafts to the driving wheels can take place in a known manner by means of toothed gearing or the like. An essential advantage of the new driving device relatively to the driving devices of this kind heretofore known consists in the fact that the differential gear casing and the transverse shafts can be arranged lower than with the known constructions of oscillating axles with centre of swing located lower than the driving wheel axes whereby the specially low position of the frame surface or of the floor with many vehicles, particularly with lorries, omnibuses and the like, is facilitated. Preferably the new construction should find application for vehicles with swinging half-axles with which the chassis is formed by a tubular body arranged in the middle of the vehicle and surrounding the driving shaft.

In the accompanying drawing the invention is illustrated by way of example and in which like reference characters refer to similar parts throughout the several views.

Fig. 1 is a plan view partly in section of a vehicle equipped with a driving mechanism according to the invention.

Fig. 2 is an elevational view partly in section of an oscillatable half axle and the connection thereof to the driven wheel and differential housing.

Referring to the drawing, on a casing 1 and by means of suitable guides 2 half-axles 3 are arranged so as to swing up and down in a known manner. In each of the tubular half-axles 3 a transverse shaft 4 is supported the inner end of which carries a bevel wheel 5. In each of the bevel wheels 5 engages in a known manner a smaller bevel wheel 5' driven by the longitudinal shaft 6. Spaced from the two smaller bevel wheels 5' each serving for the drive of one of the two bevel wheels 5, a differential gear 5a is inserted in a known manner the driving part of which is connected with the longitudinal shaft 6.

Upon a pin 7 fixed in a bracket 3a on the outer end of each half-axle 3 a driving wheel 8 is arranged. The axis of this wheel 8 is located above the centre of swing of the corresponding half-axle 3. The drive of the driving wheel is effected in a known manner by means of a pinion 9 fixed upon the outer end of the half-axle shaft 4, which pinion engages in a corresponding toothed wheel 10 connected with the wheel 8.

The outer ends of the half axles 3 adjacent the driven wheels 8 are bracingly connected to the housing 1 by means of springs 11. The front part of the housing 1 is connected to the vehicle chassis frame which includes the transmission housing 13 and the motor block 14, by means of tube 12. The motor is equipped at the front with the usual cooling means 15 and is connected to the front axle 16 which is in turn connected to the guide wheels 17 and the guiding means 18. The bottom of the vehicle body is connected to the chassis immediately over the housing 1.

By the invention the following four advantages are combined with one another in a vehicle:

1. Arrangement of the bottom of the car frame lower than with any arrangements heretofore known.
2. Reduction of the lateral movements of the wheels with the up and down swinging relatively to the lateral movements which occur with the usual construction with swinging half-axles.
3. Reduction of the non-spring-supported masses relatively to the known arrangement with oscillating axles.
4. Relatively to the known arrangement with pinion drive, high speed of rotation of the driving shaft and wheels and consequently small dimensioning of these transmission members.

I claim:—

1. In a driving arrangement for a motor vehicle in combination a longitudinal shaft driven by a motor and supported by the chassis frame, an axle shaft arranged transversely to and extending only on one side of said longitudinal shaft, means for transmitting the rotation of said longitudinal shaft to said axle shaft, a road wheel, a member arranged between said longitudinal shaft and said road wheel for supporting said road wheel and for supporting said axle shaft below the axis of said road wheel, means for transmitting the rotation of said axle shaft to said road wheel and means for connecting the inner free end of said supporting member to said chassis frame so as to enable its outer end to oscillate up and down.

2. A wheel drive mechanism for a motor driven vehicle comprising a differential casing, an axle casing extending outwardly from the differential casing, an axle rotatably mounted in said axle casing, one end of said axle casing being pivotally mounted within the differential casing whereby said axle casing may swing in a vertical transverse plane, a drive pinion carried by the axle beyond the outer end of the axle casing, an upwardly extending bracket carried by the axle casing, a stub axle carried by the upwardly extending bracket above the axle and in parallel relation thereto, a ground engaging wheel rotatably mounted on the stub axle, an internal gear carried by the ground engaging wheel, said drive pinion carried by the axle meshing with the internal gear below the axis of the wheel and means for rotating said axle from the differential casing.

In testimony whereof I affix my signature.
HANS LEDWINKA.